United States Patent
Andre

(10) Patent No.: US 8,706,665 B2
(45) Date of Patent: *Apr. 22, 2014

(54) PREDICTIVE MODEL FOR DENSITY AND MELT INDEX OF POLYMER LEAVING LOOP REACTOR

(75) Inventor: Lewalle Andre, Brussels (BE)

(73) Assignee: Total Research & Technology Feluy, Seneffe, (Feluy) (BE)

( * ) Notice: Subject to any disclaimer, the term of this patent is extended or adjusted under 35 U.S.C. 154(b) by 263 days.

This patent is subject to a terminal disclaimer.

(21) Appl. No.: 12/741,274

(22) PCT Filed: Nov. 4, 2008

(86) PCT No.: PCT/EP2008/064938
§ 371 (c)(1),
(2), (4) Date: Sep. 3, 2010

(87) PCT Pub. No.: WO2009/059969
PCT Pub. Date: May 14, 2009

(65) Prior Publication Data
US 2010/0332433 A1    Dec. 30, 2010

(30) Foreign Application Priority Data
Nov. 5, 2007   (EP) .................................... 07120022

(51) Int. Cl.
*G06F 15/18*   (2006.01)
(52) U.S. Cl.
USPC .............................................. 706/21; 706/15
(58) Field of Classification Search
None
See application file for complete search history.

(56) References Cited

U.S. PATENT DOCUMENTS

| | | | |
|---|---|---|---|
| 2,285,721 A | 6/1942 | Karp | |
| 3,152,872 A | 10/1964 | Scoggin et al. | |
| 4,448,736 A * | 5/1984 | Emery et al. | 264/40.1 |
| 4,469,853 A * | 9/1984 | Mori | 526/59 |
| 5,519,605 A * | 5/1996 | Cawlfield | 700/31 |
| 6,106,785 A * | 8/2000 | Havlena et al. | 422/109 |
| 6,213,958 B1 * | 4/2001 | Winder | 600/586 |
| 6,263,355 B1 * | 7/2001 | Harrell et al. | 708/320 |
| 6,396,716 B1 * | 5/2002 | Liu et al. | 363/17 |
| 6,403,748 B1 * | 6/2002 | Powers et al. | 526/348.2 |
| 6,683,149 B2 * | 1/2004 | Jain et al. | 526/348 |
| 6,718,234 B1 * | 4/2004 | Demoro et al. | 700/269 |
| 6,723,805 B2 * | 4/2004 | Braganca et al. | 526/61 |
| 7,024,313 B2 * | 4/2006 | Lee et al. | 702/30 |
| 7,116,414 B2 * | 10/2006 | Long et al. | 356/301 |

(Continued)

FOREIGN PATENT DOCUMENTS

| | | | | |
|---|---|---|---|---|
| EP | 1840140 A1 * | 10/2007 | | C08F 10/00 |
| WO | 97/26549 | 7/1997 | | |

(Continued)

OTHER PUBLICATIONS

Smith Haykin, "Neural Networks—A Comprehensive Foundation," 2nd Ed., Pearson Printice Hall, 1999.*

(Continued)

*Primary Examiner* — Kakali Chaki
*Assistant Examiner* — Fuming Wu

(57) ABSTRACT

The present invention discloses a method for predicting the melt index and density of the polymer in terms of the operating conditions in the reactor and vice-versa, to select the operating conditions necessary to obtain the desired product specifications.

19 Claims, 1 Drawing Sheet

(56) References Cited

U.S. PATENT DOCUMENTS

| | | | |
|---|---|---|---|
| 7,133,784 B2* | 11/2006 | Vaidyanathan et al. | 702/30 |
| 7,319,040 B2* | 1/2008 | Vaidyanathan et al. | 436/173 |
| 7,418,372 B2* | 8/2008 | Nishira et al. | 703/2 |
| 7,774,178 B2* | 8/2010 | Pannell et al. | 703/2 |
| 8,093,341 B2* | 1/2012 | Parrish et al. | 526/59 |
| 2003/0105247 A1* | 6/2003 | Braganca et al. | 526/61 |
| 2003/0120361 A1* | 6/2003 | Anderson et al. | 700/31 |
| 2004/0171779 A1* | 9/2004 | Matyjaszewski et al. | 526/303.1 |
| 2005/0272891 A1* | 12/2005 | Fouarge et al. | 526/943 |
| 2008/0065360 A1* | 3/2008 | Pannell et al. | 703/2 |
| 2010/0016523 A1* | 1/2010 | Moers et al. | 526/64 |
| 2010/0144989 A1* | 6/2010 | Kolb et al. | 526/126 |
| 2010/0324738 A1* | 12/2010 | Lewalle | 700/269 |
| 2010/0332433 A1* | 12/2010 | Lewalle | 706/21 |

FOREIGN PATENT DOCUMENTS

| | | | | |
|---|---|---|---|---|
| WO | 9726549 A1 | 7/1997 | | |
| WO | WO 97/26549 A1 * | 7/1997 | | G01R 33/46 |
| WO | WO 9726549 A1 * | 7/1997 | | |
| WO | 00/22489 | 10/1999 | | |
| WO | 0022489 A1 | 4/2000 | | |
| WO | WO 00/22489 A1 * | 4/2000 | | G05B 17/02 |
| WO | WO 0022489 * | 4/2000 | | C08F 10/02 |
| WO | WO 0022489 A1 * | 4/2000 | | |
| WO | 01/49751 | 7/2001 | | |
| WO | 0149751 A1 | 7/2001 | | |
| WO | WO 01/49751 A1 * | 7/2001 | | C08F 10/02 |
| WO | WO 0149751 A1 * | 7/2001 | | |
| WO | WO 0149751 A1 * | 7/2001 | | C08F 10/02 |
| WO | WO 01/49751 A1 * | 12/2001 | | C08F 10/02 |

OTHER PUBLICATIONS

Claudio A. Perez, "Genetic Design of Biologically Inspired Receptive Fields for Neural Pattern Recognition," IEEE Transaction on Systems, Man, and Cybernetics—Part B: Cybernetics, vol. 22, No. 2, pp. 258-270, Apr. 2003.*

EP Patent Application No. 08846994.5 dated Oct. 5, 2012 (5 pages).*

International Search Report for International Application No. PCT/EP2008/064938, mailed on Feb. 2, 2009 (3 pages).

Arshad Ahmad, et al.; "Neural Networks for Process Monitoring, Control and Fault Detection: Application to Tennessee Eastman Plant"; Malaysian Science and Technology Congress, Melaka, 2001.

Office Action issued in EP Patent Application No. 08846994.5 dated Oct. 5, 2012 (1 page).

* cited by examiner

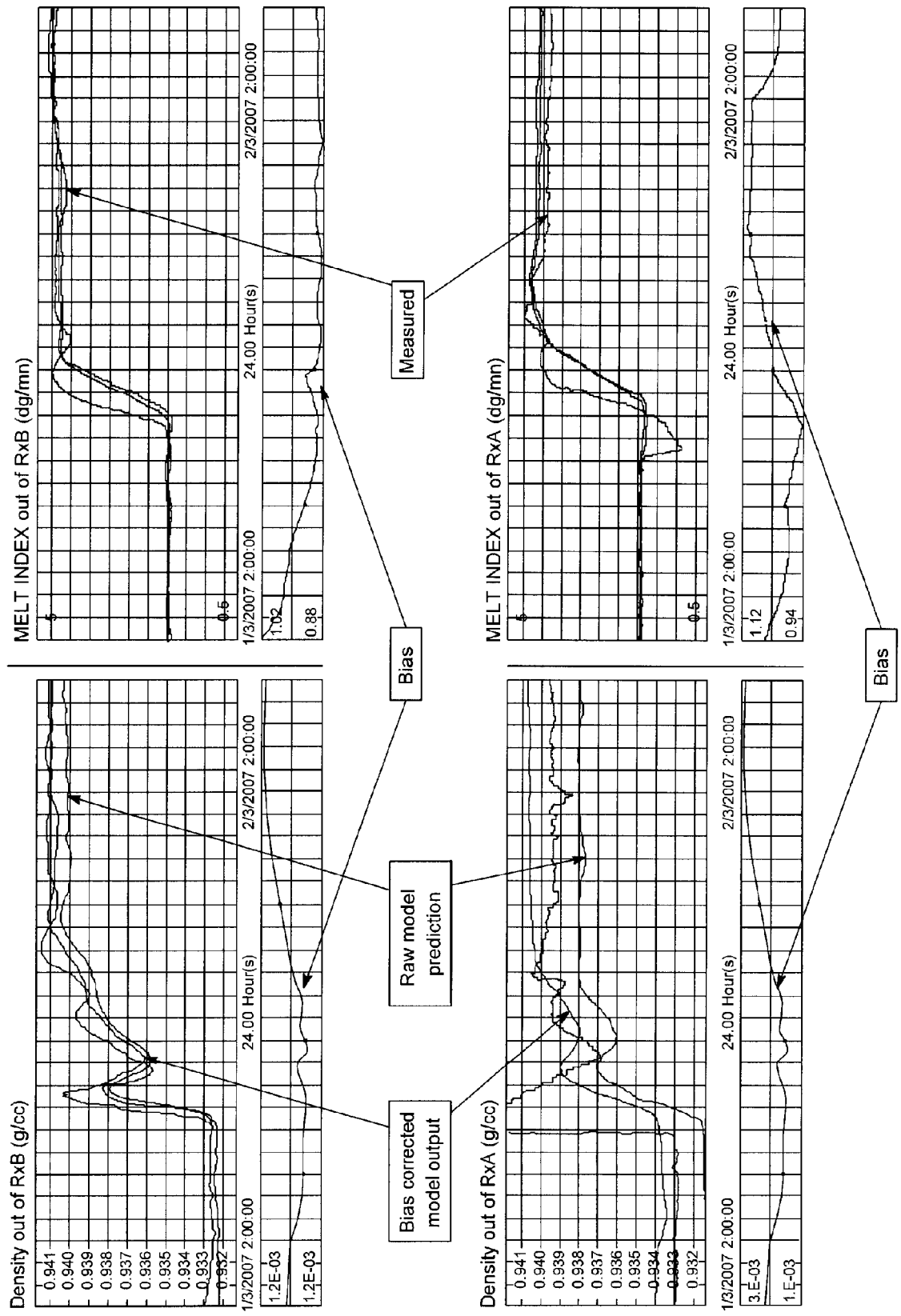

PREDICTIVE MODEL FOR DENSITY AND MELT INDEX OF POLYMER LEAVING LOOP REACTOR

CROSS-REFERENCE TO RELATED APPLICATIONS

This application claims the benefit of PCT/EP2008/064938, filed Nov. 4, 2008, which claims priority from EP 07120022.4, filed Nov. 5, 2007.

The present invention relates to the polymerisation of olefin monomers in one or several slurry loop reactor(s) and to a model for predicting the melt index and density of the polymer in terms of the operating conditions in the reactor(s).

High density polyethylene (HDPE) was first produced by addition polymerisation carried out in a liquid that was a solvent for the resulting polymer. That method was rapidly replaced by polymerisation under slurry conditions according to Ziegler or Phillips. More specifically slurry polymerisation was carried out continuously in a pipe loop reactor. A polymerisation effluent was formed which was a slurry of particulate polymer solids suspended in a liquid medium, ordinarily the reaction diluent and unreacted monomer (see for Example U.S. Pat. No. 2,285,721). It was necessary to separate the polymer and the liquid medium comprising an inert diluent and unreacted monomers without exposing the liquid medium to contamination so that said liquid medium could be recycled to the polymerisation zone with minimal or no purification. As described in U.S. Pat. No. 3,152,872, a slurry of polymer and the liquid medium were collected in one or more settling legs of the slurry loop reactor from which the slurry was periodically discharged to a flash chamber thus operating in a batch-wise manner.

The double loop systems are quite desirable as they offer the possibility to prepare highly tailored polyolefins by providing different polymerising conditions in each reactor, typically by changing the amount of hydrogen and comonomer from one reactor to the other. Polymer product is transferred from the first to the second loop through one or several transfer line(s).

In order to insure that the polymer product satisfies the grade requirements, it is necessary to measure the density and melt flow index of the exiting polymers at regular interval of time during their production. There is however a delay of about 90 minutes between the time the polymer is sampled and the time its characteristics are obtained from the laboratory. If the polymer is found to be off specifications, several hours of production need to be declassified. In addition, the operating conditions need to be altered and the amplitude of the correction to be applied and/or the nature of the variables that need to be modified are not obvious. In addition, correcting one grade's characteristics such as density modifies other characteristics such as for example the melt index. Assessing coherent changes in the polymerisation conditions that correct the off-specification characteristics, without modifying those that are correct, is often obtained by a lengthy trial and error process. There is often a further delay, due to the search for correct operating conditions, before the correct specifications are obtained.

Prior art document WO01/49751 discloses a process for producing high density polyethylene or linear low density polyethylene in gas phase reactors, isolated or combined, under polymerisation conditions, in the presence of hydrogen, oxygen, inert diluent(s) and chromium catalyst, provided with on-line control of certain process variables as well as physical properties of the produced resin. The process comprises the use of models for the inference of the physical properties and of the process variables that are not continuously measured as well as models which are relevant for the control of said properties and of the operating conditions of the process. The control of the process variables provides the maximisation of production rate and of catalyst productivity.

Prior art document WO00/22489 discloses a system for on-line inference and control of physical and chemical properties of polypropylene and its copolymers. The system comprises models for the inference of physical and chemical properties that are not continuously measured and relevant models to control these properties as well as production rate, density of the reaction medium and other process variables of interest. The control system allows maximisation of production rate and catalyst yield.

Prior art document WO97/26549 discloses an on-line nuclear magnetic resonance (NMR) system and related methods for predicting one or more polymer properties. A neural network is used to develop a model which correlates process variables in addition to manipulated NMR output to predict polymer properties. In another embodiment, a partial least square regression technique is used to develop a model of enhanced accuracy. Either the neural network technique or the partial least square regression technique may be used in combination with a described multi-model or best-model-selection scheme. The polymer can be selected from polyethylene, polypropylene, polystyrene or ethylene-propylene rubber.

These models are stationary models.

There is thus a need to obtain an accurate estimate of the polymer density and melt index in order to set up the process variables before starting polymerisation.

It is an aim of the present invention to develop a model able to predict the density and melt index in terms of operating conditions.

It is also an aim of the present invention to use this model to determine the operating conditions necessary to obtain simultaneously all the desired polymer grade characteristics.

It is another aim of the present invention to design a model that is able to deal adequately with strong non-linearities, highly coupled variables and dynamical effects due to product mixing in the reactors.

It is a further aim of the present invention to use the model to optimise the polymer production.

It is yet another aim of the present invention to prepare a table of corrections to be applied manually to the operating conditions in order to bring back the polymer product on target when it deviates from the required specifications.

Any one of those aims is, at least partially, fulfilled by the present invention.

Accordingly, the present invention provides a method for selecting the reactor operating conditions in order to produce a homo- or co-polymer of specified density and melt flow index, in the presence of a Ziegler-Natta or of a metallocene catalyst system, that comprises the steps of:

a) selecting n input variables linked to the reactor conditions;
b) defining a constrained neural network model of general form $$f_1 = 1/(1+\exp(-(a_{11}*X_1+a_{12}*X_2+a_{13}*X_3+\ldots+b_2)))$$

$$f_2 = 1/(1+\exp(-(a_{21}*X_1+a_{22}*X_2+a_{23}*X_3+\ldots b_2)))$$

$$f_3 = 1/(1+\exp(-(a_{31}*X_1+a_{32}*X_2+a_{33}*X_3+\ldots+b_3)))$$

$$\ldots$$

$$Res = 1/(1+\exp(-(a_{(n+1)1}*f_1+a_{(n+1)2}*f_2+a_{(n+1)3}*f_3+\ldots+b_{(n+1)})))$$

wherein the $X_i$'s are the n normalised input variables, the $a_{ij}$'s and $b_i$'s are numerical coefficients, the $f_i$'s are intermediate functions and Res is the scaled resulting polymer property estimate;

c) adjusting the parameters of step b) minimise the error on Res under appropriate constraints, said constraints being imposed, by equalities or inequalities, for example on Res or on any partial derivative of Res of any order or on aij's, or on bi's, or on Xi's, or on Ci's or on combination thereof and wherein partial derivatives measure the variation of the result derived from an equation when one and only one of the variables is changed by an infinitesimal step;

d) predicting in real time the density and melt flow index resulting from the operating conditions from the equations of step b) and including, whenever appropriate, dynamic step responses to any varying input conditions;

e) infer appropriate values for any combination of 2 input variables $X_i$ and $X_j$, such as for example 1-hexene and $H_2$, knowing the other (n-2) variables, such as for example the temperature and $C_2$ off-gas, and the desired values of density and melt index;

f) applying appropriate mixing rules to infer estimates of the density and melt flow index of the products leaving the reactor, including the situation when product formed in another reactor is present as an input to the reactor where the model is applied.

A separate neuronal system is established for density and for melt index and step c) is thus repeated for each of these variables.

In the present invention, all input parameters are thus determined before polymerisation is started and these parameters are then set up manually. Corrections, if needed, are also calculated using the same model and a table of corrections is provided. These corrections are also applied manually.

In each reactor, the input conditions (or operating conditions) are typically selected from polymerisation temperature, pressure in the reactor, monomer, comonomer, hydrogen, catalyst, activating agent or reaction additive, concentrations in the feeds or in the bulk of the reactor, catalyst characterising parameters, production rate, solids concentration, and solids residence time.

Typical constraints may result from imposing characteristics of a particular product such as for example the density of a low melt index homopolymer;

from imposing that, at constant melt index, the density of the polymer has a negative first partial derivative with respect to the comonomer concentration but a positive second partial derivative;

from imposing, for the purpose of numerical stability, that the sum of the square of the $a_{ij}$'s and $b_i$'s remains bound by some value;

from imposing that the regression between the observed values and the modelled ones should have a slope of 1 and an intercept of 0; or from any other physical or numerical hypotheses defined and imposed on the variables by the man skilled in the art.

Typical dynamical response may be determined by observing the temporal evolution of each modelled variable in response to a step modification of a single variable of the model. Typically, most of the variables have first order linear dynamic responses, but the variation of a variable that has a permanent effect, such as for example a catalyst poison, has an integrating response that can be approximated by a second-order linear dynamic response.

The term 'partial derivative' used throughout this description obeys the conventional definition: it is a derivative with respect to one variable, all other variables being kept constant.

Appropriate mixing rules are applied to predict the density and the melt flow of the polymer exiting the reactor. These mixing rules include the situation when product formed in another reactor is admitted into the reactor where the predictive model is used to estimate properties of the product leaving said reactor. Mixing rules are determined by supposing each reactor as perfectly mixed, and by calculating an appropriate average of the situation existing in a reactor at each moment in the past and taking into account the residence time in the reactor. The situation at any time includes polymer product that is synthesised locally and/or polymer being brought into the reactor from an upstream reactor.

In another aspect of the present invention, the same model is used to prepare a table of corrections to be applied manually to the operating conditions in order to return the polymer product to the target specifications when it deviates from the required characteristics due to the effect of some uncontrolled variable such as, for example, the presence of trace components acting as catalyst poisons.

The preferred monomer is ethylene and the optional comonomer is 1-hexene.

Preferably, the input variables are polymerisation temperature, ethylene concentration, amount of hydrogen and of 1-hexene in the feed.

The constraints are equalities or inequalities related to any one of $X_i$'s, $a_{ij}$'s, $b_i$'s, $f_i$'s, Res or combinations thereof, or to any of their partial derivatives of any order, wherein partial derivative is understood as derivative with respect to one variable, all other variables being kept constant.

The model is also used to determine the corrections to be applied to the operating conditions when the polymer products drift off specifications. In that case the preferred operating conditions are the amount of hydrogen and 1-hexene.

LIST OF FIGURES

FIG. 1 displays the predicted density and melt index curves as a function of time for the polymer exiting the first reactor (reactor B) and the second reactor (reactor A) of two serially connected slurry loop reactors. It also displays the corresponding measured values of density and melt index. There is a fairly constant bias between predicted and measured values.

EXAMPLES

Example 1

Polymerisation of ethylene was carried out in a slurry loop reactor with a catalyst system based on a bridged bistetrahydroindenyl catalyst component.

The target density of the final polymer was 0.940 g/cc and its target melt flow index was 4.5 dg/min.

The predicted density and melt flow curves are displayed in FIG. 1 as well as the measured value. Except for a stable bias, it can be seen that there is an excellent agreement between predicted and measured values.

Example 2

In this example, the model of the present invention was used to define a table of corrections to be applied to the operating conditions in order to bring back the polymer to target specifications when deviations occurred.

In a single reactor, the operating conditions were adjusted to prepare a copolymer of ethylene and 1-hexene having a density of 0.9225 g/cc and a melt index of 0.2 dg/min. The polymerisation was carried out with a metallocene catalyst system under the conditions summarised in Table 1.

TABLE 1

| Temperature | 83° C. |
|---|---|
| $C_2$ off gas | 4 wt % |
| $H_2$ | 3.6 g/ton $C_2$ |
| 1-hexene | 61.2 kg/ton $C_2$ |

The model was used to predict the corrections to be applied on the amount of hydrogen and 1-hexene in order to modify the density and melt flow index to other desired values. An example of corrections is displayed in Table 2. The corrections are expressed in g of $H_2$ per ton of $C_2$/kg of 1-hexene per ton of $C_2$.

TABLE 2

| Density (g/cc) | Melt index (dg/min) | |
|---|---|---|
| | 1.37 | 1.32 |
| 0.9322 | −12.5/+32.0 | −12.0/+32.6 |
| 0.9312 | −11.4/+26.3 | −10.9/+27.0 |

The invention claimed is:

1. A method comprising:
selecting operating conditions in a double loop slurry reactor to produce a polymer of a pre-determined density and a pre-determined melt flow index prior to polymerization of the polymer, by:
selecting n input variables that are linked to operating conditions;
defining a constrained neural network model of the general form:

$$f_1 = 1/(1+\exp(-(a_{11}*X_1 + a_{12}*X_2 + a_{13}*X_3 + \ldots + b_1)))$$

$$f_2 = 1/(1+\exp(-(a_{21}*X_1 + a_{22}*X_2 + a_{23}*X_3 + \ldots + b_2)))$$

$$f_3 = 1/(1+\exp(-(a_{31}*X_1 + a_{32}*X_2 + a_{33}*X_3 + \ldots + b_3)))$$

$$\ldots$$

$$Res = 1/(1+\exp(-(a_{(n+1)1}*f_1 + a_{(n+1)2}*f_2 + a_{(n+1)3}*f_3 + \ldots + b_{(n+1)})))$$

wherein the $X_i$'s are n normalised input variables, the $a_{ij}$'s and $b_i$'s are numerical coefficients, the $f_i$'s are intermediate functions, and Res is a resulting scaled polymer property estimate;
separately for the specified density and the specified melt flow index, adjusting numerical coefficients in the constrained neural network model to minimise error on Res under constraints, such constraints being imposed by equalities or inequalities on $X_i$'s, $a_{ij}$'s, $b_i$'s, $f_i$'s, Res, any partial derivative $X_i$'s of any order, any partial derivative $a_{ij}$'s of any order, any partial derivative $b_i$'s of any order, any partial derivative $f_i$'s of any order, any partial derivative Res of any order, or combinations thereof, wherein the partial derivatives measure variations of results derived from the constrained neural network model when only one of the input variables is changed by an infinitesimal step;
predicting a density and a melt flow index resulting from the operating conditions using the constrained neural network model;
inferring values for any combination of two input variables $X_i$ and $X_j$, knowing the other (n−2) input variables, the specified density, and the specified melt flow index;
calculating an average amount of the polymer product in each reactor in order to use the constrained neural network model to infer estimates of a density and a melt flow index of the polymer product leaving each reactor of the double loop slurry reactor resulting from the operating conditions;
wherein the polymer product in each reactor includes polymer product that is synthesized within that reactor, or a combination of the polymer product that is synthesized within that reactor and polymer product that is admitted into that reactor from an upstream reactor;
wherein the input variables are determined before polymerisation is started to simultaneously obtain the pre-determined density and the pre-determined melt flow index for the polymer.

2. The method of claim 1, wherein the polymer is a homopolymer comprising ethylene, or wherein the polymer is a copolymer comprising ethylene and 1-hexene.

3. The method of claim 1, wherein the input variables comprise polymerisation temperature, ethylene concentration, amount of hydrogen, and amount of 1-hexene in a feed.

4. The method of claim 3, wherein the input variables further comprise pressure in the double loop slurry reactor, catalyst concentration, activating agent concentration, reaction additive concentration, catalyst characterising parameters, production rate, solids concentration, and solids residence time.

5. The method of claim 1, wherein the inferred values of the two input variables $X_i$ and $X_j$ are an amount of hydrogen and an amount of 1-hexene.

6. The method of claim 1, wherein the catalyst system is based on a bridged bistetrahydroindenyl catalyst component.

7. The method of claim 1, further comprising using the constrained neural network model to determine corrections to be applied to the operating conditions when the polymer product is off specifications.

8. The method of claim 7, wherein the corrections are manually applied to an amount of hydrogen and 1-hexene.

9. The method of claim 8, wherein the amount of hydrogen and 1-hexene are corrected to modify the density and the melt flow index.

10. The method of claim 7, further comprising preparing a table of the corrections to be manually applied to the operating conditions in order to return the polymer product to target specifications.

11. The method of claim 10, wherein the corrections are expressed in the table as grams of hydrogen per ton of ethylene/kilograms of 1-hexene per ton of ethylene.

12. The method of claim 1, further comprising observing a temporal evolution of each input variable in response to a step modification of a single input variable of the constrained neural network model to determine dynamical response.

13. The method of claim 12, wherein variation of an input variable that has a permanent effect has an integrating response that is approximated by a second-order linear dynamic response.

14. The method of claim 13, wherein the input variable that has the permanent effect is a catalyst poison.

15. The method of claim 1, wherein the density and the melt flow index are predicted in real time.

16. The method of claim 1, wherein the average of the amount of polymer product in each reactor of the double loop slurry reactor is calculated at each moment in the past.

17. The method of claim 1, wherein the selected operating conditions are manually set up prior to polymerization of the polymer.

18. The method of claim 17, further comprising manually applying corrections to the operating conditions when the polymer product is off specifications.

19. The method of claim 18, further comprising preparing a table of the corrections to be manually applied to the operating conditions in order to return the polymer product to predetermined specifications.

* * * * *